Aug. 27, 1968  D. KOLKMAN ET AL  3,399,044
APPARATUS FOR MANUFACTURING FLUORESCENT LAMPS
Filed July 6, 1964  4 Sheets-Sheet 1

INVENTORS
DIRK KOLKMAN
ANTON REYNDERS
BY
AGENT

INVENTORS
DIRK KOLKMAN
ANTON REYNDERS
BY
AGENT

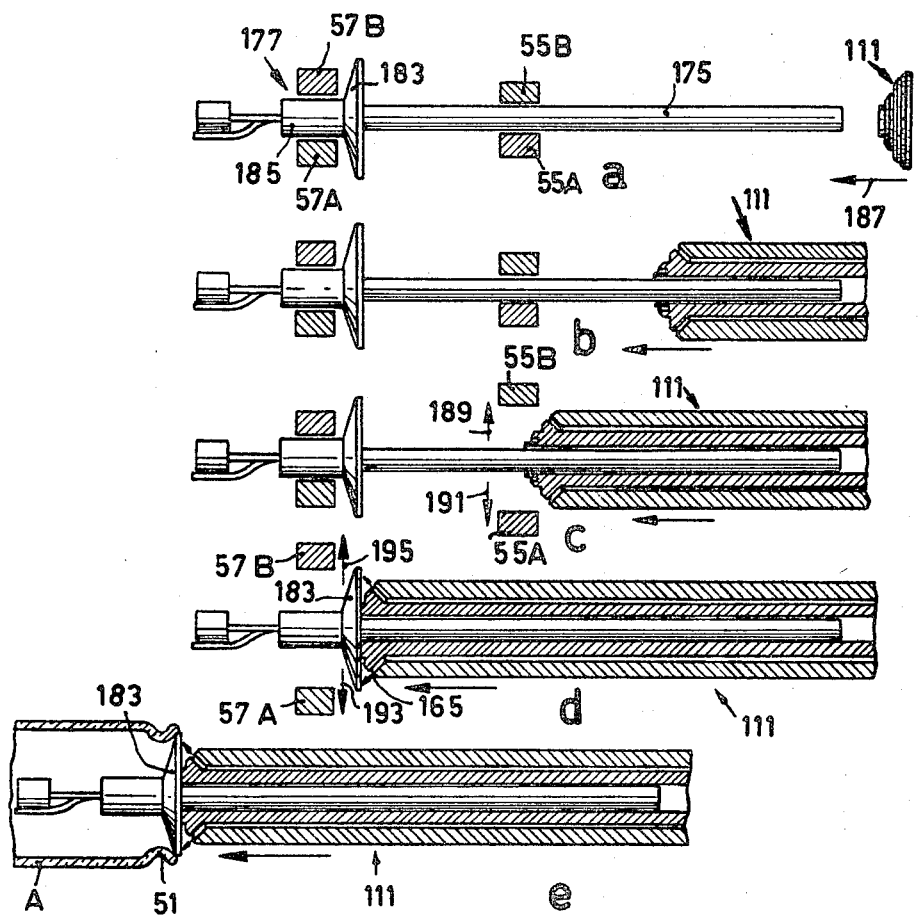

United States Patent Office 3,399,044
Patented Aug. 27, 1968

3,399,044
APPARATUS FOR MANUFACTURING
FLUORESCENT LAMPS
Dirk Kolkman and Anton Reynders, Emmasingel, Eindhoven, Netherlands, assignors to North American Philips Company, Inc., New York, N.Y., a corporation of Delaware
Filed July 6, 1964, Ser. No. 380,238
Claims priority, application Netherlands, July 11, 1963, 295,210
7 Claims. (Cl. 65—155)

ABSTRACT OF THE DISCLOSURE

An apparatus for simultaneously sealing stem mounts to both ends of a horizontally conveyed tube for a fluorescent lamp, which apparatus comprises a plurality of tube holders arranged to be moved in a direction at right angles to the longitudinal axes of the tubes and a plurality of supports arranged to synchronously follow the movement of the tube holders for at least part of the distance to be travelled by the said holders and also arranged to guide the stem mounts to both ends of the respective tube simultaneously, and a plurality of burners also arranged to follow the said movement, the flames emerging from the burners being directed onto the flanged portion of the stem mount during the sealing operation.

---

This invention relates to automatic apparatus for inserting and heat sealing lamp stem mounts to a lamp tube for a fluorescent lamp.

In the known apparatus two stem mounts are brought into contact each with one end face of a horizontally arranged glass tube for a discharge lamp by means of a support for stem mounts. The supports, the tube and the stem mounts engaging the tubes are then brought into rotation. Subsequently the flanged portions of the stem mounts are so heated by flames emerging from burners which with respect to the rotating tube are stationary that a seal can be made.

In making what is referred to as "horizontal seals" it has always been considered desirable for the tubes and the stem mounts to rotate relative to the burners; it was assumed that only this method resulted in seals of satisfactory quality. The said method, however, always required the use of a comparatively complicated machine, for special means had to be provided for causing the stem mounts and the tubes to revolve not only about the axis of rotation of the machine but also about their own axes; in addition the said supports and burners has to be capable of axial movement relative to the tube.

When in contradistinction to the usual rotation of the tube and stem mounts relative to the burner flames an arrangement is chosen in which the tubes, stem mounts and burners do not rotate about their axes, it is found that a satisfactory seal is obtainable without the upper surface of the flanged portion of the stem mount being heated more rapidly than the lower surface of the said stem mount. This provides the attractive possibility of a considerable simplification of the known apparatus.

The apparatus in accordance with the invention is characterized in that the burners, tubes and stem mounts when travelling are stationary relative to their axes and the burners also act as the supports for the stem mounts, each burner being provided with a central aperture which extends from the end face nearer the tube and into which, in a position of the burner remote from the tube, the stem of a stem mount may be inserted to a predetermined depth and held, the flames emerging from the burner being directed onto the desired portions of the flange of the stem mount inserted into the said aperture. Thus, in the machine under consideration, the burners act as supports for the stem mounts so that in the sealing operation the special stem mount supports may be dispensed with.

Since the stem mounts may be inserted to a predetermined depth into the said apertures of the burners at a location remote from the tube ends, the flanged portions of each mount may previously be heated when the mounts are axially moved towards the horizontally held tube. In the said position the flames emerging from the burner may already be directed onto the flanged portion of the stem mount in the desired manner; this situation may be maintained during the period in which the stem mounts supported by the burners are simultaneously conveyed one to each end of a tube, so that in their end positions the stem mounts are pre-heated substantially to the desired temperature. Thus, the cycle period of such an apparatus may be shorter than that of a conventional apparatus.

Each burner is preferably designed so that the flames diverge conically to the circumference of the flanged portion of the stem mount. This is of particular importance when the diameters of the tube ends have been reduced by rolling. Tubes having such ends are referred to as "shouldered" tubes. Hence the burner apertures preferably are in the form of a conical slit between an outer sleeve and an inner sleeve of the burner which are axially adjustable with respect to one another and are centered by fins provided on the outer surface of the inner sleeve. Manufacture of a burner having such a slit is comparatively simple. By means of such a slit the flame is accurately adjustable and highly uniform.

In the apparatus in accordance with the invention the tubes are transported in the horizontal position. It is desirable for the tube to be held in a manner preventing axial displacement, the burners supporting the stem mounts being capable of axial movement towards both ends of the tube.

Frequently, however, the length of the available tubes is not constant while it is desirable for the flanged portions of the stem mounts to engage the tube ends with a predetermined pressure.

In the apparatus in accordance with the invention this is achieved by mounting the burners, which act as a support for the stem mounts, for slipping displacement on a slide arranged to be compulsorily moved in the axial direction of the tubes, the arrangement being such that when the burners are moved towards the tube the stem mounts supported by the burners engage the tube ends and by slipping stop with respect to the still moving slides. Thus the slides may perform a complete prescribed reciprocating stroke, while the burners carrying the stem mounts lag behind the slide by slipping when by contact with the tube a given engagement pressure has been built up between the mount and the tube. In this construction the contact pressure may be adjustable by the use of a slip clutch which maintains the burner in engagement with the slide, the slipping pressure being regulated by spring tension.

In order that the invention may readily be carried out, an embodiment thereof will now be described, by way of example, with reference to the accompanying drawings, in which.

Figure 1:
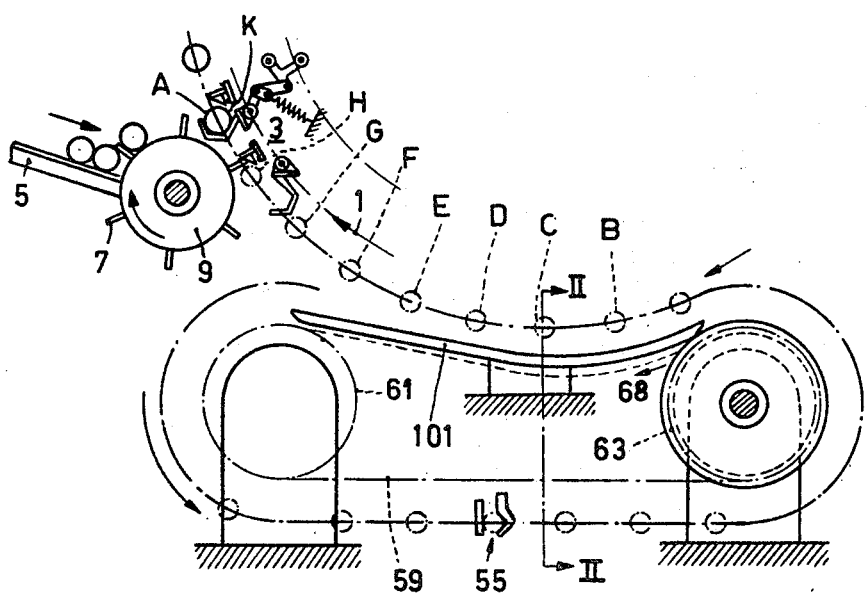
FIGURE 1 is a schematic side elevation of part of a sealing machine, in which the tubes the two ends of which are each to be provided with a stem mount are conveyed in a horizontal position.
Figure 3:
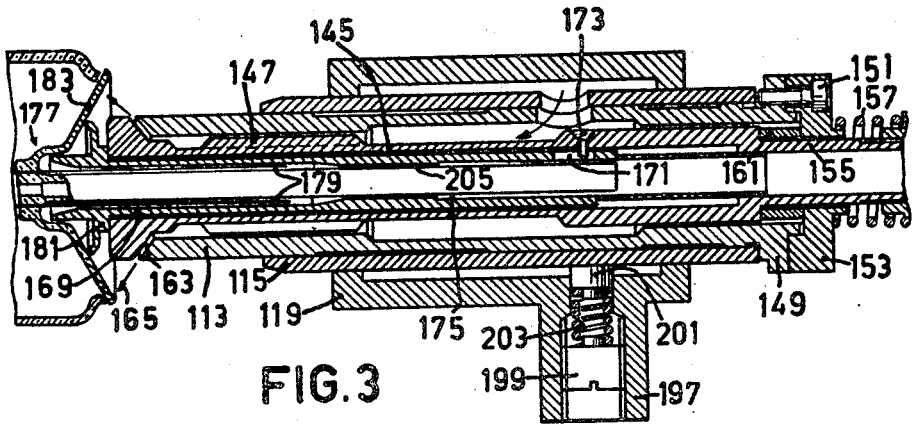
Figure 2:
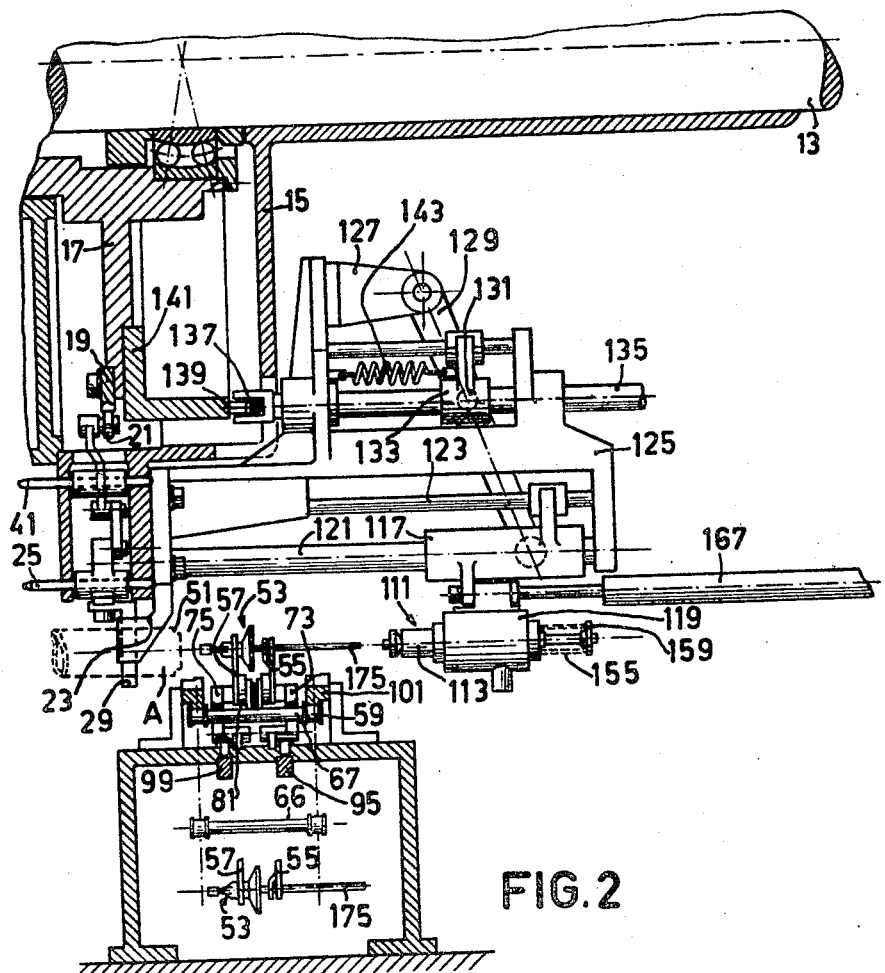

FIGURE 2 is a part elevation, part sectional view taken on the line II—II of FIGURE 1, FIGURE 3 is a cross-sectional view of one of the burners used for sealing a stem mount to each end of a tube, and FIGURES 4a to 4e serve to illustrate the operation of the machine in accordance with the invention and show successive steps of the operation of sealing a stem mount to one end of a horizontally held tube.

Figure 1A:
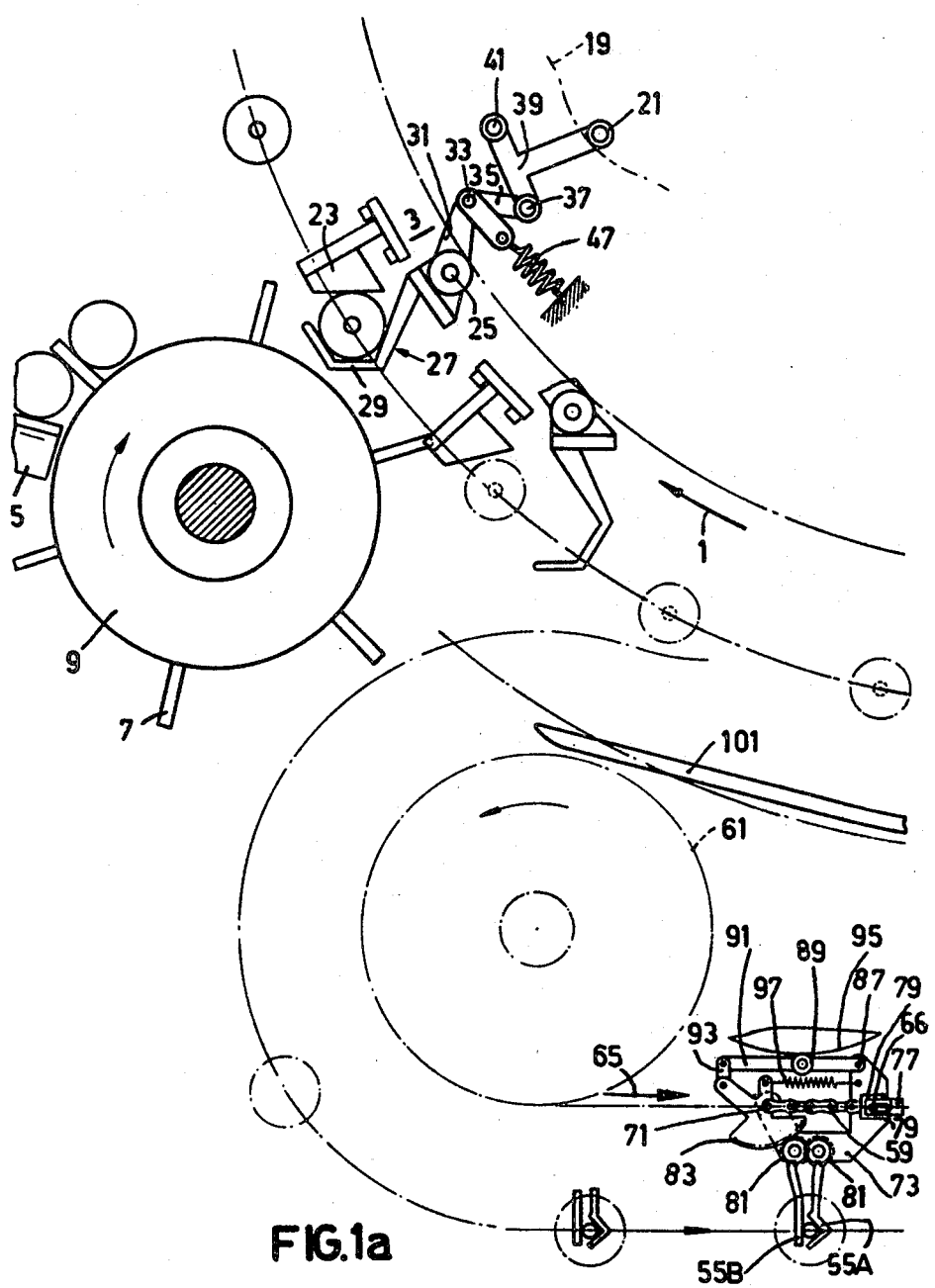
FIGURE 1a shows part of FIGURE 1 to an enlarged scale.

The apparatus shown diagrammatically in FIGURES 1 and 1a is provided with a series of pincer-shaped holders 3, adapted to travel as indicated by the arrow 1 and capable of holding a plurality of tubes in horizontal position and evenly spaced in a circle concentric with the axis of rotation. A runway 5 feeds tubes to the apparatus. The tubes are distributed over the temporarily opened pincer-shaped holders 3 which pass the runway by a feeding roller 9 provided with paddles 7. Each tube is held at both ends in a pincer-shaped holder in the manner shown in FIGURE 2 with respect to a tube A drawn in broken lines.

The apparatus has a central shaft 13 (FIG. 2) to which a frame 15 is secured. The frame 15 is rotatable with respect to a stationary part 17 comprising a plurality of components. The said part 17 includes a camway 19 over which rollers 21 of the holders 3 are guided when the frame 15 rotates. The pincer-shaped holders 3 have a "fixed" jaw 23 secured to the frame 15 and a "movable" jaw 27 pivotable about a spindle 25. The movable jaw 27 comprises a hooked arm 29 and an arm 31. The arm 31 is hinged at 33 to a coupling member 35 which is hinged at 37 to a lever 39. The lever 39 carries the roller 21 and is adapted to pivot about a spindle 41. A draw spring 47 connects the pivot pin 33 to the frame of the machine. The camway 19 is shaped so that the rollers 21 open the jaw 27 to receive a tube supplied by the feed roller 9 and subsequently are closed again. Thus, during the transport in the holders 3 the horizontally held tubes cannot rotate about their axes. Initially the tubes are open at both ends. They have previously been shouldered at an area 51 by rolling (see tube A in FIGURE 2).

A stem mount 53 must be guided and sealed to each open end of the tube A (FIG. 4). For this purpose a plurality of stem mounts 53 are held between jaws 55A and 55B and jaws 57A and 57B of pincers 55 and 57 secured to an endless chain 59 (chain pincers). The chain 59 consists of two chains running over chain wheels 61 and 63. The two chains are coupled to one another by a plurality of pins (for example, pins 66 and 67 of FIGURE 2). By means of the pincers 55 and 57 of the double chain 59, which is adapted to travel in the direction indicated by the arrow 65 (FIG. 1a), the stem mounts 53 gripped between the jaws of the pincers 55 and 57 can be transported at a constant speed.

FIGURE 1a shows schematically one of the chain pincers 55 in the closed position. Two bridge pieces 73 and 75 (FIG. 2) are secured to adjacent pins 66 and 71 of the double chain 59. The pin 66 is secured in a slide block 77 adapted to slide by spring action in a recess 79 in the bridge piece 73. Thus the correct spacing between the pins 66 and 71 is automatically set, permitting the said spacing to be slightly reduced when the bridge piece runs over the chain wheel 61. The jaws 55A and 55B for gripping a stem mount 53, which are each provided with a pinion 81, are secured to the bridge piece 73 by spindles. The pinions mesh with one another and are rotated by a toothed quadrant 83 adapted to pivot about the pin 71. A lever 91 carrying a cam follower 89 is adapted to pivot about a pin 87 secured in the bridge piece 73 and is hinged at its other end to a coupling member 93 which is also hinged to the quadrant 83. The cam follower 89 cooperates with a camway 95. A draw spring 97 is stretched between the pin 87 and the quadrant 83 and urges the cam follower 89 against the camway 95. The pincers 57 are provided with a similar operating mechanism; the jaws 57A and 57B are operated by means of a camway 99 (FIG. 2).

The apparatus further comprises a fixed guide member 101 which guides a double chain 59 along a predetermined path. Viewed from the said guide member 101 the longitudinal axes of the stem mounts gripped in the spincers on the chain 59 perform an accurately determined translational movement.

The apparatus further comprises a plurality of burner assemblies disposed opposite each end of a lamp tube in the manner shown in FIGURE 2 with respect to a burner 111.

A burner casing constituted by sleeves 113 and 115 is capable of axial sliding movement in a sheath 119 attached to a slide 117. The slide 117 is capable of sliding movement over a guide constituted by axes 121 and 123. The said axles are mounted in a U-member 125 secured to the rotatable machine frame 15. The U-member 125 is provided with a lug 127 to which one end of a rod 129 is hinged. The other end of the rod 129 is coupled to the slide 117 by a slot-pin connection. The rod 129 carries, at an area situated between its ends, a pin 131 enclosed in a slot in a block 133. The block 133 is secured to an axle 135 which is slidably supported in the U-member 125. The axle 135 carries a roller 137 which cooperates with the surface 139 of a stationary camway 141. The block 133 is urged to the surface 139 by a draw spring 143. For each position of the apparatus there is a separate U-member 125 accommodating a single burner 111. When the frame is rotated, the roller 137 moves over the camway 141 so as to control the axial movement of the axle 135. By this control the slide 117 and hence the burner are moved either towards or away from the tube A. In FIGURE 2 the component parts of the burner and its movement are shown in elevation for the sake of clarity.

The construction of the burner is shown in detail in FIGURE 3. The burner housing constituted by the sleeves 113 and 115 encloses an inner sleeve 145 provided with a plurality of radial fins 147 for radially positioning the sleeve 145. The sleeve 113 is provided with a collar 149 to which a thrust ring 153 is secured by screws 151. The inner sleeve 145 comprises a portion 155, a spring 157 and a spring abutment 159 by which the inner sleeve 145 is thrust to the right in FIGURE 3. A spacing ring 161 is interposed between the inner sleeve 145 and the thrust ring 153. Between the inner sleeve 145 and the sleeve 113 there is produced an annular conical slit 163, the size of which depends upon the thickness of the spacing ring 161 and through which a sharp conical flame can emerge as indicated by the arrow 165. Fuel is supplied to the burner through a hose indicated by 167 in FIGURE 2. An axially displaceable sheath 169 is disposed within the inner sleeve 145; its range of travel is determined by the length of a slot 171 into which a screw 173 projects. The said sheath is adapted to surround the stem portion 175 of a stem mount 177 and the current supply leads 179 projecting from the mount and to centre the stem portion 175. The sheath 169 has an enlarged portion 181 which forms a stop-abutment for the flanged portion 183 of the stem mount 177.

The speed at which the chain 59, the holders 3 for the tubes and the burners 111 are driven is such that at least along the common part of their paths (near the guide member 101) the burners 111 and the stem mounts 153 are synchronized with respect to the central shaft 13 of the apparatus.

Since the burner arrangements at both ends of each tube are identical, the operation of the apparatus will be described only for one end of the tube.

We start from a position (in FIG. 1) in which the chain pincers 55, 57 have just passed the wheel 63 in the direction indicated by the arrow 68. This corresponds with the position as shown in FIGURE 4a in which the mount 177 is carried by the pincers 55 and 57. The jaws 57A and 57B of the pincers 57 grip a glass cylindrical portion 185 of the stem mount 177 and the jaws of the pincers 55 grip the stem 175 (per se) (position B of FIGURE 1; FIGURE 4b). The burner 111 is aligned with the stem 175. The pincers 57, 55 and the burner 111 move at constant speed in the direction indicated by the arrow 1 of FIGURE 1. The burner 111 while travelling in the direction indicated by the arrow 1 is moved to the left as indicated by the arrow 187 (FIG. 4). When a portion of the stem 175 is surrounded and centered by the burner (position C; FIGURE 4c) the jaws of the pincers 55 are opened as indicated by the arrows 189 and 191. The mount is now supported by the pincers 57 and the burner 111 (FIGURE 4c). The burner 111 is then moved further to the left until nearly the entire stem 175 is surrounded by the burner 111 (FIGURE 4d). In the meantime the position D of FIGURE 1 is reached and the burner is ignited. While the movement indicated by the arrow 1 continues the pincers 57 are opened, the jaws 57A and 57B being moved in directions indicated by arrows 193 and 195. Opening and closing of the pincers 55 and 57 is achieved by the movement of the chain 59 wherein the cam followers of the said pincers are forced to cooperate with appropiately profiled camways 95 and 99 (FIG. 2). The burner flames 165 emerge through the conical slit 163 so as to heat the rim of the flanged portion 183 of the mount 177 (FIGURE 4d). When the mount 177 has been engaged by the burner 111 and the pincers 55 and 57 have been removed (at position E of FIGURE 1) the princers 55 and 57 are moved on by the chain 59 of the portion of their path near the chainwheel 61. Here they may again grasp a stem mount. The burner 111 carrying the stem mount 177 and heating the flanged portion 183 of the said mount continues along in the direction indicated by the arrow 1 to positions F, G and H FIGURE 1) the pincers 55 and 57 are moved on by the holders 3. When the burner 111 is moved further to the left (FIGURE 4e) the flanged portion 183 of the mount finally abuts the shouldered portion 51 of the tube A with a certain pressure and is sealed thereto. Subsequently the burner 111 is returned to its initial position remote from the tube A.

In the embodiment described, the tubes A, the stem mount 53 and the burners 111 do not rotate about their respective axes.

To enable tubes of different lengths to be handled by the apparatus described in a manner such that the stem mounts are moved toward the tube ends with a predetermined contact pressure, in the said apparatus the burner 111 is slippingly displaceable in the sheath 119 (FIG. 3). For this purpose the sheath 119 has a projecting portion 197 into which a plug 199 is screwed which urges a block 201 to the sleeve 115 with a force determined by a thrust spring 203. The said force is adjustable.

When the slide 117 and the sheath 119 (FIGURE 2) are moved to the left, the burner 111 follows this movement to the left. At a certain instant it strikes the tube A held rigidly in the axial direction (FIGURE 4e) so that a certain contact pressure is produced. When this pressure has reached a given value, the sleeve 115 will slip over the block 201 so that the burner 111 lags behind and the sheath 119 is moved further to the left until the extreme left-hand position is reached. When the tube A and the flanged portion 183 of the stem mount are sufficiently heated a seal is made and the sheath 119 is moved to the right again. Because a constricted portion 205 of the sheath 169 surrounds the stem 175 with a slight clamping pressure the said movement to the right may, if desired, be used to stretch the seal between the tube A and the flanged portion 183 to a slight extent.

During its movement to the right (FIGURE 3) the burner 111 strikes a stop abutment (not shown) disposed near the extreme righthand position of the sleeve 119. This again produces a slightly slipping movement in a position opposite to that of the aforementioned slipping movement. As a result the sheath 119 and the sleeve 113 can again assume their initial relative positions.

What is claimed is:

1. Apparatus for heat sealing fluorescent lamp tubes and lamp stems comprising a plurality of lamp-tube-holder means for supporting lamp tubes in both a horizontal position and a stationary manner with respect to rotation around the respective longitudinal axis of each tube; means for moving said lamp-tube-holder means in a first path; a plurality of lamp-stem-holder means for supporting lamp stems in both a horizontal position and a stationary manner with respect to rotation around the longitudinal axis of each lamp stem; means for moving said lamp stems in a second path, said second path paralleling at least a part of said first path whereby said lamp-tube-holder means and said lamp-stem-holder means are positioned in axially aligned confronting relationship; a plurality of burner assembly means adjacent to said lamp-tube-holder means, each of said burner assembly means including lamp stem gripping means on one end thereof, and flame emitting means adjacent said gripping means for uniformly applying heat to the portion of said lamp stem which engages said lamp tube and for heat sealing said portion to said lamp tube; and reciprocal motion means attached to said burner assembly means for moving said burner assembly means into gripping engagement with one of said lamp stems and then moving said gripped lamp stem into engagement with said lamp tube, and means for operating said reciprocal motion means when said first path and said second path are in parallel relationship.

2. Apparatus for heat sealing fluorescent lamp tubes and lamp stems according to claim 1 wherein said flame emitting means include a nozzle adjacent said lamp stem gripping means, said nozzle comprising a pair of concentric sleeves, the inner sleeve having a radial enlargement adjacent one end, the outer sleeve including one end surface in adjacent spaced relation to said radial enlargement, said space defining a frusto-conically shaped orifice for emitting an outwardly diverging flame, said orifice being adapted to impinge said flame on said portion of the lamp stem to be sealed to said lamp tube.

3. Apparatus for heat sealing a fluorescent lamp tube and a lamp stem according to claim 1 wherein said lamp-tube-holders include a plurality of guide members corresponding in number to the number of lamp-tube-holders, one each of said burner assembly means being slidingly coupled to each of said guide members, said reciprocal motion means adapted for driving said burner assembly along said guide member whereby said burner assembly means engages said lamp stem means, moves said engaged lamp stem means into engagement with said lamp tube means, releases said lamp stem, and returns to the starting position.

4. Apparatus for heat sealing fluorescent lamp tubes and lamp stems according to claim 3 wherein said reciprocal motion means include a reciprocating driver means for moving said burner along said guide member and an adjustable resiliently biased slip coupling for permitting complete reciprocating movement of said driver means after said burner assembly means and said lamp stem engage said lamp tube.

5. Apparatus for heat sealing fluorescent lamp tubes and lamp stems according to claim 4 wherein said flame emitting means include a nozzle adjacent said lamp stem gripping means, said nozzle comprising a pair of concentric sleeves, the inner sleeve having a radial enlargement adjacent one end, the outer sleeve including one end surface in adjacent special relation to said radial enlargement with said space defining a frusto-conically shaped orifice for emitting an outwardly diverging flame said orifice being adapted to impinge said flame on said portion of the lamp stem to be sealed to said lamp tube.

6. Apparatus for heat sealing fluorescent lamp tubes and lamp stems according to claim 4 wherein said adjustable resiliently biased slip coupling comprises a cylindrical sheath concentrically located on said burner assembly means and a friction coupling interconnecting said sheath and said burner assembly means; and said reciprocating driver means is connected to said sheath whereby said reciprocating driver means will move said sheath in a longitudinal axial direction with respect to said burner assembly means after said burner assembly abuttingly engages said lamp tube.

7. Apparatus for heat sealing fluorescent lamp tubes and lamp stems according to claim 4 wherein said reciprocating driver means comprises a cam assembly attached to said lamp-tube-holder means; a cam follower means supported by said guide member; a lever means pivotally attached to said lamp-tube-holder means and to said burner assembly means and slidably engaging said cam follower means; said cam follower means engaging said cam means when said first path and said second path are in parallel relationship.

References Cited
UNITED STATES PATENTS 3,113,011  12/1963  Gilbert et al. _____ 65—155 XR
2,721,422  10/1955  Baker et al. _____ 65—272 X DONALL H. SYLVESTER, *Primary Examiner.*

F. W. MIGA, *Assistant Examiner.*

UNITED STATES PATENT OFFICE
CERTIFICATE OF CORRECTION

Patent No. 3,399,044                                        August 27, 1968

Dirk Kolkman et al.

It is certified that error appears in the above identified patent and that said Letters Patent are hereby corrected as shown below:

Column 4, line 13, "axes" should read -- axles --. Column 5, line 27, "princers" should read -- pincers --; line 33, "FIGURE 1)" should read -- (FIGURE 1) --; same line 33, "the pincers 55 and 57 are moved on" should read -- . In position K the tube A is held --.

Signed and sealed this 13th day of January 1970.

(SEAL)
Attest:

Edward M. Fletcher, Jr.                            WILLIAM E. SCHUYLER, JR.
Attesting Officer                                                Commissioner of Patents